May 12, 1953 H. E. MARVEL 2,638,581
SIGNAL DEVICE FOR FILTERS

Filed June 21, 1950 3 Sheets-Sheet 2

HARVEY E. MARVEL
INVENTOR.

BY Edmund W. E. Kamm
ATTORNEY

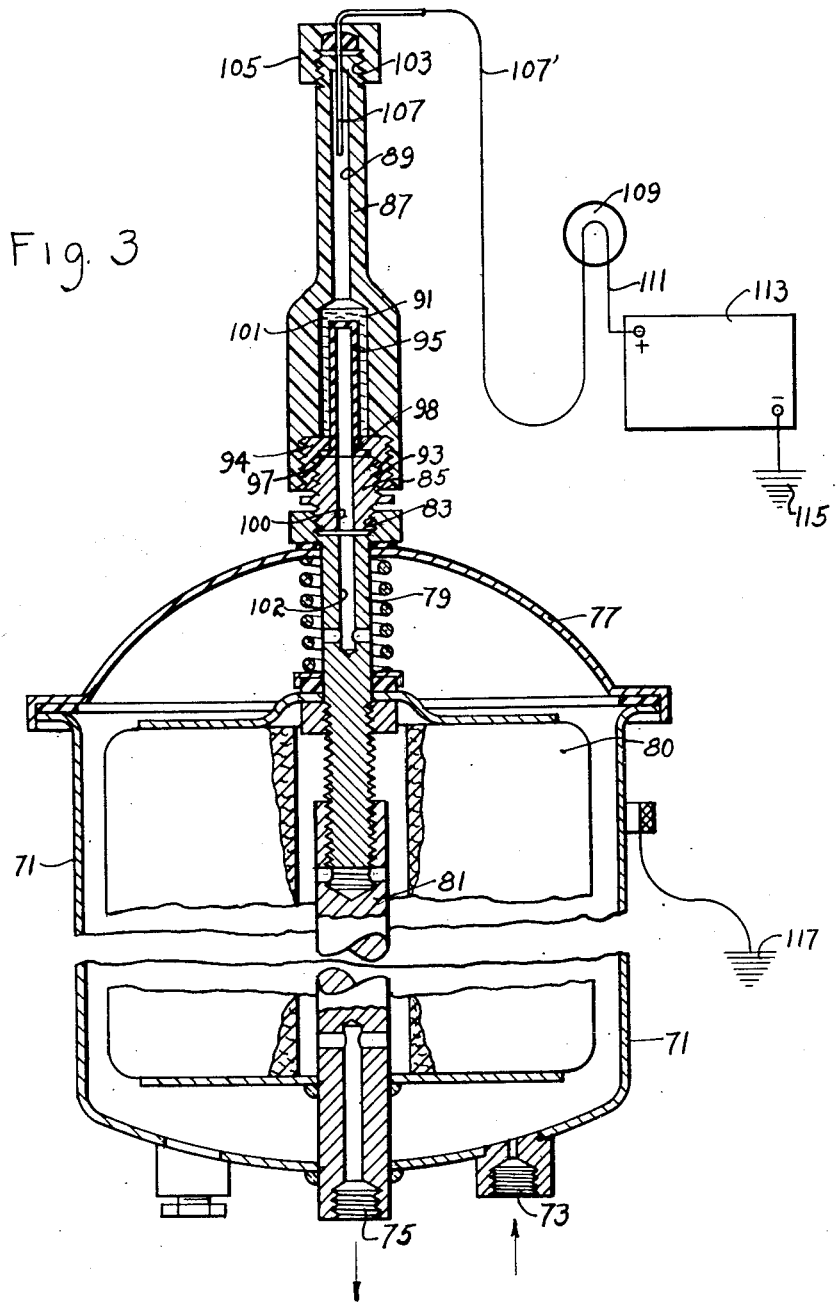

Patented May 12, 1953

2,638,581

UNITED STATES PATENT OFFICE 2,638,581

SIGNAL DEVICE FOR FILTERS

Harvey E. Marvel, Fort Wayne, Ind., assignor to The Briggs Filtration Company, Washington, D. C., a corporation of Maryland Application June 21, 1950, Serial No. 169,342

10 Claims. (Cl. 340—240)

This invention relates to a signal for filters. More specifically, it relates to a signal which may be attached to a filter of the replaceable cartridge type which will indicate when the cartridge has been rendered unserviceable and requires replacing.

It is an object of the invention to provide a signal which is inexpensive, simple and easy to install.

Another object of the invention is to provide a signal which is positive in operation.

A further object of the invention is to provide a transparent signal tube in which the level of liquid indicates the state of operability of the cartridge.

Yet another object of the invention is to provide a transparent signal device having an indicator section, in which dirty liquid does not contact the indicator section.

Another object of the invention is to provide means which will retain the reading on the signal even when the signal operating pressure has been dissipated.

A further object of the invention is to provide a remote indication of the signal.

These and other objects will become apparent from a study of this specification and the drawings which are attached hereto, made a part hereof, and in which:

Figure 3 is a vertical sectional view of a modified form of signal similar to that of Figure 2, but provided with remote indicating means.

Figure 1:
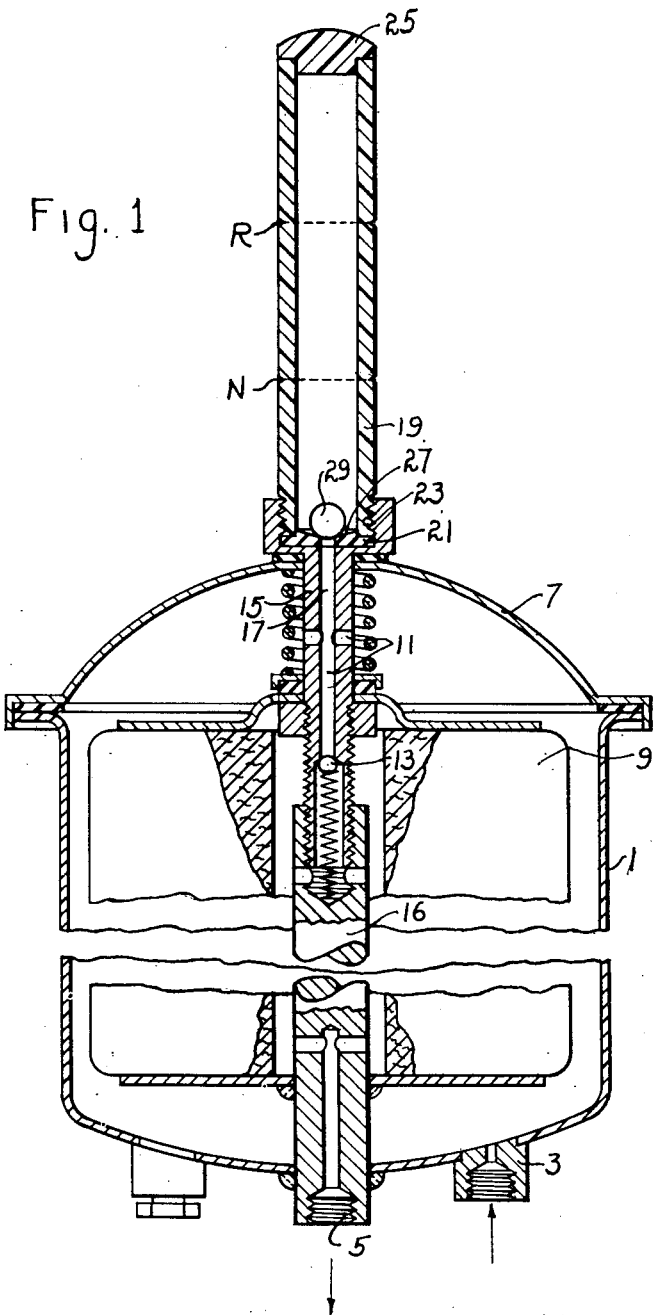
Figure 1 is a vertical sectional view of a filter with a signal attached and showing valve means for retaining the indication after the pressure has been dissipated.

Referring to Figure 1, the numeral 1 represents a filter bowl having an inlet 3, an outlet 5 and a cap 7. A filter cartridge 9 is mounted in the path of the fluid passing from the inlet to the outlet.

A by-pass passage 11 and a spring loaded valve 13 are provided in a stem 15 to provide a path for unfiltered liquid around the cartridge when it is plugged. The stem screws into post 16 which is a part of the filter bowl.

The passage 17 in the stem 15 communicates with passage 11 and with a transparent tube 19 which is sealingly mounted on a gasket 21 in a socket 23 formed in the end of the stem. The upper end of the tube is sealed by a plug 25.

The gasket 21 is provided with a valve seat 27 adapted to receive a downwardly closing ball valve 29.

Operation

When a new cartridge is installed, the stem 15 is unscrewed from the post 16. At this time the valve ball 29 may be lifted to drain the signal tube 19 and restore the pressure therein to atmospheric. When the filter is reassembled, with a new filter element and the fluid, under pressure, flows to the filter, liquid from the filter will fill the bowl and rise to a normal height in the tube 19, which may be scored or otherwise marked to indicate a normal level.

As the filter becomes plugged, the inlet pressure rises and compresses the air in the tube above the liquid and the liquid level rises in the tube. When a pressure equivalent to that at which the by-pass valve 13 opens is reached, the level in tube 19 will have reached a maximum, which may be indicated by a score or other mark R which indicates that the cartridge should be replaced.

The ball 29 is seated to prevent liquid from flowing from the tube whenever the pressure is released on the filter so that an indication is retained on the indicator at all times.

First modified form

Figure 2:
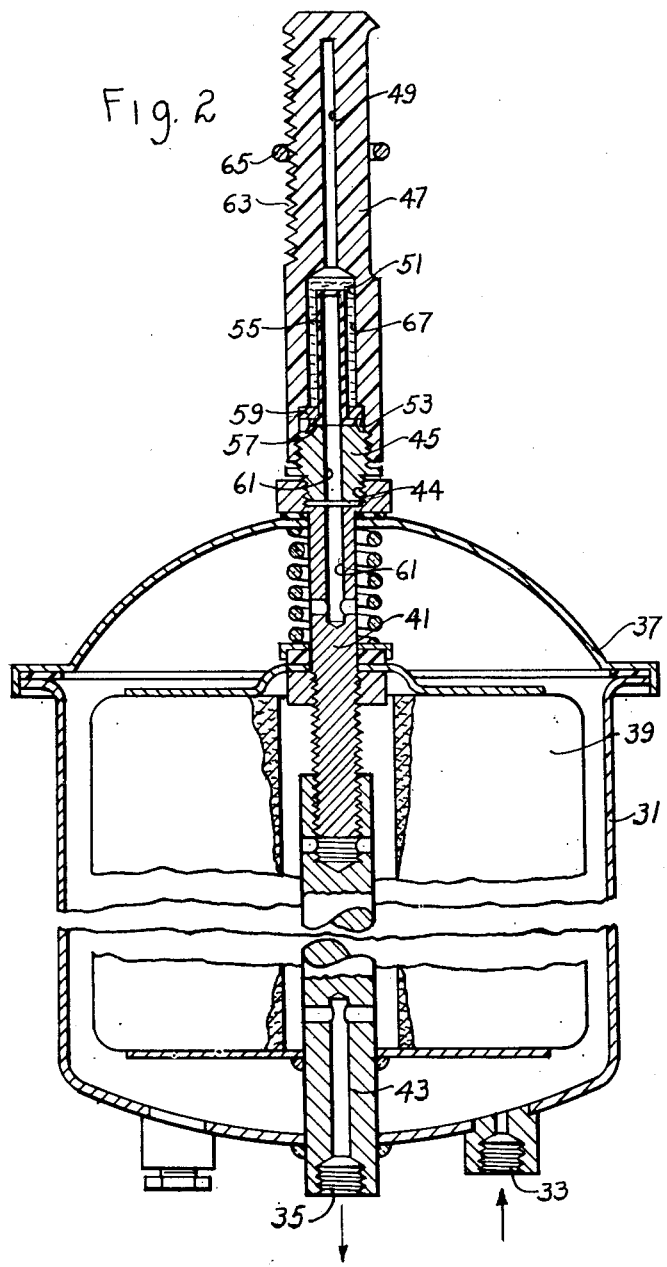
Figure 2 is a vertical sectional view of a modified form of signal in which a fluid other than the fluid being filtered is used as an indicator.

The form shown in Figure 2 comprises a filter including a bowl 31 having an inlet 33, an outlet 35 and a cap 37. A filter cartridge 39 is mounted in the path of fluid passing from the inlet to the outlet.

The cap is held in sealing relation on the bowl by a stem 41 which is screwed in a post 43 which forms part of the bowl.

The upper end of the stem is provided with a socket 44 into which a nipple 45 is fitted. A transparent tube 47 is fitted on the nipple and has an indicating bore 49, a reservoir bore 51 and a counterbore 53.

A tubular bag or diaphragm 55 of rubber or other extensible material has a radial flange 57 at its mouth which is held against the nipple by a collar 59 and the shoulder formed by the counterbore.

A channel 61 in the stem and nipple communicates with the inlet and with the interior of the bag.

The exterior of the tube may be threaded at 63 to receive a ring nut 65 which may be set at will.

An indicating liquid 67 which may be mercury, colored glycerine, colored alcohol or other low freezing point liquid is disposed in the reservoir outside of the bag.

Operation

In manufacturing the signal device the indicating liquid is placed in the reservoir and the member 55 and nipple 45 are installed so that the liquid is trapped in the reservoir.

When the signal is installed on a filter, fluid under pressure from the filter will be applied to the interior of the bag 55 to expand it and displace liquid from the reservoir into the bore 49. The air trapped in the bore is compressed by the liquid.

When the pressure in the filter reaches a predetermined amount, at which the cartridge should be replaced, the liquid level in bore 49 will have attained a corresponding predetermined level which may be indicated by the position of the ring nut on the tube 47. The operator will thus be apprised, on seeing that the indicator has risen to the ring nut level in bore 49, that the filter cartridge should be changed. The observation must, of course, be made when the filter is under operating pressure because the indicating liquid would otherwise be in the reservoir and not in bore 49.

Second modification

A local and remote indicating signal device is disclosed in Figure 3 in which the filter comprises a bowl 71 having an inlet 73 and an outlet 75 and a cap 77. A stem 79 is screwed into a post 81 which forms a part of the bowl and supports the filter cartridge 80. The stem has a socket 83 at its upper end for the reception of a nipple 85.

A tube 87 of electrical insulating material which is preferably transparent, such as a clear plastic material has an indicating bore 89, a reservoir bore 91, preferably of greater diameter than bore 89, and a threaded counterbore 93 which receives a bushing 94. The latter has an internal threaded socket 96 which receives a nipple 85. The bushing and nipple have central perforations 98 and 100 respectively, which communicate with the channel 102 in the stem.

An extensible bag or diaphragm 95, of rubber or other elastic material extends through the opening 98 and has a flange 97 which is compressed between the bushing and nipple to form a seal across the bottom of the reservoir.

The bag confines, in the reservoir bore, a liquid 101 such as mercury, colored alcohol or colored glycerine or any other suitable material which is electrically conductive or is made so by adding acid or other ionized material.

The tube is open at its upper end and is threaded at 103 to receive a cap 105 in which an electrode 107 is sealed. The electrode extends down into the bore 89 to a level which will be occupied by the indicating liquid when the pressure in the filter indicates that it is plugged.

The electrode is connected by a wire 107' to one side of a signal lamp 109, the other side of which is connected by wire 111 to a battery 113. The battery is grounded at 115 and the filter is grounded at 117.

Indicia may be marked on or attached to the tube, if desired, although this is not necessary since the electrode 107 serves as the maximum height indicator.

Operation

As stated above, the reservoir 91 is filled, preferably to the bottom of bore 89 with a conductive liquid which is also preferably colored so that it will serve as a visible indicator in the transparent tube.

When normal pressure is applied to the filter, the indicating liquid will rise in the bore 89, compressing the air therein.

When the filter becomes plugged, the pressure rises further and forces the liquid into contact with the electrode 107 which closes a circuit from the battery through the lamp 109 to light the lamp and signal to the operator that the cartridge requires replacement.

The lamp may, of course, be located at a point remote from the filter.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter having an inlet and an outlet, the combination of an upright, transparent tube having its upper end closed, means defining a single conduit connecting the lower end of the tube with the filter inlet and a gas disposed in the upper portion of the tube.

2. In a filter having an inlet and an outlet, the combination of an upwardly extending, transparent tube having its upper end closed, means defining a single conduit connecting the lower end of the tube with the filter inlet, a diaphragm disposed in sealing relation across the tube, a gas confined in the top portion of the tube, an indicator liquid disposed in the tube above the diaphragm and level indicating means disposed adjacent the upper end of the tube.

3. In a filter having a case provided with an inlet and an outlet, a stem attached to the case and having a single conduit therein communicating with the inlet, an upwardly directed tube socket formed on the stem, a transparent tube having a closed and an open end and having its open end mounted in the socket so that the tube extends upwardly, a yieldable diaphragm mounted transversely of the tube, said tube having a large bore disposed adjacent the diaphragm, which communicates with a small bore disposed adjacent the upper end of the tube, a gas disposed in the upper end of the tube and an indicator liquid disposed in the large bore.

4. In a filter having an inlet and an outlet, the combination of an upright, transparent tube having its upper end closed, means defining a single conduit connecting the lower end of the tube with the filter inlet, a gas disposed in the upper portion of the tube and a check valve disposed adjacent the conduit and closing outwardly of the tube to prevent fluid escaping therefrom.

5. In a filter having a case provided with an inlet and an outlet, a stem attached to the case having a single conduit therein communicating with the inlet, an upwardly directed tube socket formed on the stem, a combined valve seat and gasket of resilient material disposed in the socket, a transparent tube having a closed and an open end and having its open end mounted in said socket in sealing relation with said gasket so that the tube extends upwardly, a gas disposed in the tube and a check valve in the tube and cooperating with said seat to prevent the flow of fluid from the tube.

6. In a filter having an inlet and an outlet, the combination of an upwardly extending, transparent tube having its upper end closed and its lower end open, a reservoir formed in the tube intermediate its ends, a resilient bag extending into said reservoir, means for sealing the bag in the tube to close off the reservoir, a liquid disposed in the reservoir and a gas disposed in the upper portion of the tube and means for applying pressure from the inlet of the filter to the bag.

7. In a filter having an inlet and an outlet, the combination of an upwardly extending, transparent tube having its upper end closed and its lower end open, a reservoir formed in the tube intermediate its ends, a counterbore formed in the lower portion of the reservoir, a resilient bag extending into said reservoir and having a flange seated in the counterbore, means for sealing the flange against the tube to close off the reservoir, a liquid disposed in the reservoir and a gas disposed in the upper portion of the tube and means for applying pressure from the inlet of the filter to the bag.

8. In a filter having an inlet and an outlet, the combination of an upwardly extending, transparent tube having its upper end closed, means defining a single conduit connecting the lower end of the tube with the filter inlet, a diapragm disposed in sealing relation across the tube, a gas confined in the top portion of the tube, an electrode extending into the tube adjacent the upper end thereof, an electric signal means connected with the electrode, a current conductive liquid disposed in the tube above the diaphragm and a source of electric energy connected to said signal means.

9. In a filter having an inlet and an outlet, the combination of an upwardly extending tube of electrical insulating material, said tube having a bore at the upper end, an intermediate reservoir and a counterbore at the lower end, a bushing of current conducting material sealed in said counterbore and having a perforation therein, an extensible bag mounted in the perforation so as to extend into the reservoir, means for sealing the bag against the bushing, means for connecting said tube to the filter with the bag in communication with the filter inlet, a gas confined in the upper portion of the tube, an electrically conductive liquid in the reservoir and an electrode sealedly mounted in the tube and extending into the upper portion of the tube.

10. In a filter having an inlet and an outlet, the combination of an upwardly extending tube of electrical insulating material, said tube having a bore at the upper end, an intermediate reservoir and a counterbore at the lower end, a bushing of current conducting material sealed in said counterbore and having a perforation therein, an extensible bag mounted in the perforation so as to extend into the reservoir, means for sealing the bag against the bushing, means for connecting said tube to the filter with the bag in communication with the filter inlet, a gas confined in the upper portion of the tube, an electrically conductive liquid in the reservoir and an electrode sealedly mounted in the tube and extending into the upper portion of the tube, a current responsive signal and a source of current connected with said electrode and the liquid in said reservoir.

HARVEY E. MARVEL.

References Cited in the file of this patent

UNITED STATES PATENTS

| Number | Name | Date |
|---|---|---|
| 1,411,802 | Mosher | Apr. 4, 1922 |
| 1,685,211 | Beck | Sept. 25, 1928 |
| 2,145,304 | Hill | Jan. 31, 1939 |
| 2,294,330 | Clark | Aug. 25, 1942 |
| 2,328,131 | Eisler | Aug. 31, 1943 |
| 2,348,651 | Schelly | May 9, 1944 |
| 2,458,086 | MacMillan | Jan. 4, 1949 |

FOREIGN PATENTS

| Number | Country | Date |
|---|---|---|
| 471,732 | Germany | Feb. 18, 1929 |